(12) United States Patent
Mori et al.

(10) Patent No.: US 9,759,139 B2
(45) Date of Patent: Sep. 12, 2017

(54) VEHICLE ENGINE AUTOMATIC CONTROL DEVICE

(71) Applicant: Nissan Motor Co., Ltd., Kanagawa (JP)

(72) Inventors: Kouichi Mori, Kanagawa (JP); Motoyuki Hattori, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 178 days.

(21) Appl. No.: 14/361,634

(22) PCT Filed: Oct. 23, 2012

(86) PCT No.: PCT/JP2012/077327
§ 371 (c)(1),
(2) Date: May 29, 2014

(87) PCT Pub. No.: WO2013/080703
PCT Pub. Date: Jun. 6, 2013

(65) Prior Publication Data
US 2014/0358406 A1  Dec. 4, 2014

(30) Foreign Application Priority Data

Nov. 30, 2011 (JP) ................. 2011-262817

(51) Int. Cl.
*F02D 35/00* (2006.01)
*F02N 11/08* (2006.01)

(52) U.S. Cl.
CPC .......... *F02D 35/00* (2013.01); *F02N 11/0822* (2013.01); *F02D 2200/60* (2013.01);
(Continued)

(58) Field of Classification Search
CPC .. Y02T 10/48; F02N 11/0844; F02N 11/0818; F02N 11/0814; F02N 11/0855;
(Continued)

(56) References Cited

U.S. PATENT DOCUMENTS 4,192,279 A * 3/1980 Maisch ................... F02D 17/04
                                                        123/179.1
6,190,284 B1 * 2/2001 Kuroda .................. B60K 6/485
                                                        123/179.4
(Continued)

FOREIGN PATENT DOCUMENTS

CN    102046945 A    5/2011
JP    2002-221059 A  8/2002
(Continued)

OTHER PUBLICATIONS

International Search Report for corresponding International Application No. PCT/JP2012/077327, mailed Jan. 29, 2013 (4 pages).
(Continued)

*Primary Examiner* — Sizo Vilakazi
(74) *Attorney, Agent, or Firm* — Osha Liang LLP

(57) ABSTRACT

A vehicle engine automatic control device has a brake operation amount detecting unit that detects an amount of brake operation by a driver, an engine stopping/re-starting unit that, during coast drive, stops an engine based on the amount of brake operation that is detected, and, after the engine stops, re-starts the engine when the amount of brake operation that is detected falls below a first threshold, and a first threshold setting unit that sets the first threshold smaller as vehicle speed becomes lower.

11 Claims, 9 Drawing Sheets

(52) U.S. Cl.
CPC ...... *F02D 2250/18* (2013.01); *F02N 11/0833* (2013.01); *F02N 11/0844* (2013.01); *F02N 2200/0801* (2013.01); *F02N 2200/0805* (2013.01); *F02N 2200/101* (2013.01); *F02N 2200/102* (2013.01); *Y02T 10/48* (2013.01)

(58) Field of Classification Search
CPC ....... F02N 2200/0801; F02N 2200/022; F02N 11/0822; F02N 11/0833; F02D 41/042; F02D 35/00
USPC .............................................. 123/179.4, 325
See application file for complete search history.

(56) References Cited

U.S. PATENT DOCUMENTS

| | | | |
|---|---|---|---|
| 2002/0103055 A1 | 8/2002 | Tani et al. | |
| 2011/0046864 A1 | 2/2011 | Kamiya | |
| 2011/0112740 A1* | 5/2011 | Hashimoto | F02D 17/02 |
| | | | 701/70 |
| 2011/0132308 A1* | 6/2011 | Liu | F02N 11/0855 |
| | | | 123/179.4 |
| 2012/0208674 A1* | 8/2012 | Doering | F02D 41/0215 |
| | | | 477/107 |

FOREIGN PATENT DOCUMENTS

| | | |
|---|---|---|
| JP | 2003-35175 A | 2/2003 |
| JP | 4374805 B2 | 12/2009 |

OTHER PUBLICATIONS

Written Opinion for corresponding International Application No. PCT/JP2012/077327, mailed Jan. 29, 2013 (3 pages).

* cited by examiner

VEHICLE ENGINE AUTOMATIC CONTROL DEVICE

BACKGROUND

Technical Field

The present invention relates to an engine automatic control device that automatically stops and re-starts the engine while driving.

Related Art

As a vehicle engine automatic control device, the technology described in JP4374805B has been disclosed. According to this device, even while the vehicle is driving, the engine is stopped when the amount of brake operation becomes equal to or greater than an engine stop determination threshold, to improve mileage, and the engine is re-started when the amount of brake operation becomes equal to or lower than an engine start determination threshold.

SUMMARY OF INVENTION

The above conventional device is configured such that, at and above a predetermined vehicle speed at which the vehicle is determined to be in a driving state, the engine (re-)start determination threshold is fixed regardless of the vehicle speed, and therefore there is a possibility that, while driving at a reduced speed before stopping the vehicle, the engine may be re-started against the driver's intention, and mileage cannot be improved sufficiently. For example, while driving at a reduced speed before stopping the vehicle, the amount of brake operation by the driver changes, and the amount of brake operation tends to be smaller as the vehicle speed becomes lower. However, if the engine start determination threshold is set regardless of the vehicle speed, there is a possibility that the amount of brake operation may readily become equal to or lower than the engine start determination threshold and the engine is re-started.

One or more embodiments of the present invention provides a vehicle engine automatic control device that can improve mileage better.

With the vehicle engine automatic control device according to one embodiment, the engine start determination threshold is set smaller as the vehicle speed lowers.

Embodiments of the present invention and advantages of the present invention will be described in detail below with reference to the accompanying drawings.

DETAILED DESCRIPTION

Figure 1:
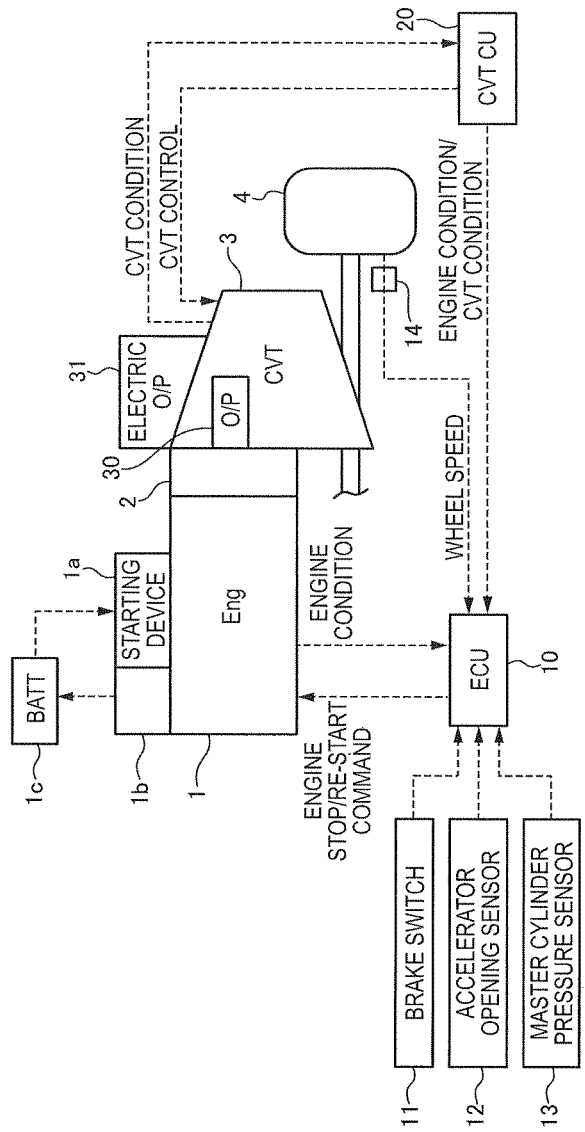
FIG. 1 is a system diagram showing a configuration of a vehicle engine automatic control device according to embodiment 1.

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a system diagram showing a configuration of a vehicle engine automatic control device according to embodiment 1. On the output side of an engine 1, which is an internal combustion engine, a torque converter 2 is provided. To the output side of the torque converter 2, a belt-type continuously-variable transmission (CVT) 3 is connected. Rotational driving force that is output from the engine 1 is input in the belt-type continuously-variable transmission 3 via the torque converter 2, and, after a gear change by a desired transmission ratio, transmitted to drive wheels 4.

The engine 1 has a starting device 1a that starts the engine, and an alternator 1b that generates power. In the starting device 1a, a starter motor is provided. Based on an engine start command, the starting device 1a drives the starter motor using power that is supplied from an in-vehicle battery 1c, and cranks the engine. Also, the starting device 1a injects fuel, and, after that, when the engine 1 becomes capable of self-sustaining rotation, stops the starter motor. The alternator 1b generates power by being allowed to rotate and drive by the engine 1, and supplies the generated power to the battery 1c and so on.

The torque converter 2 amplifies torque at a low vehicle speed, and, having a lockup clutch, engages the lockup clutch and regulates the relative rotation between the output shaft of the engine 1 and the input shaft of the belt-type continuously-variable transmission 3 at and above a predetermined vehicle speed CSVSP1 (for example, approximately 14 km/h).

The belt-type continuously-variable transmission 3 is formed with a starter clutch, a primary pulley, a secondary pulley, and a belt that is provided to bridge over these pulleys, and achieves a desired transmission ratio by changing the pulley groove width with hydraulic pressure control. Also, in the belt-type continuously-variable transmission 3, an oil pump 30 to be driven by the engine 1 is provided. While the engine is working, this oil pump 30 serves as a hydraulic pressure source, supplies the converter pressure and the lockup clutch pressure of the torque converter 2, and also supplies the pulley pressure and the clutch engagement pressure of the belt-type continuously-variable transmission 3.

Furthermore, an electric oil pump 31 is provided in the belt-type continuously-variable transmission 3. The electric oil pump 31 is configured to be able to activate and supply the required hydraulic pressure to each actuator, when the engine automatically stops and the supply of hydraulic pressures by the oil pump 30 is not possible. Consequently, even when the engine is stopped, it is possible to compensate for leakage of the working oil, and also maintain the clutch engagement pressure.

The working conditions of the engine 1 are controlled by an engine control unit (ECU) 10. In the engine control unit 10, a brake signal from a brake switch 11, which outputs ON signals in accordance with brake pedal operations by the driver, an accelerator signal from an accelerator pedal opening sensor 12, which detects the amount of accelerator pedal operation by the driver, a brake operation amount signal (master cylinder pressure) from a master cylinder pressure sensor 13, which detects the master cylinder pressure that is produced based on the amount of brake pedal operation, the wheel speed from wheel speed sensors 14, which are provided in each wheel (the wheel speed is synonymous to a vehicle speed signal when the vehicle speed is detected from the wheel speed), a CVT condition signal from a CVT control unit (CVT CU) 20, which will be described later, and signals representing the engine water temperature, the crank angle, the engine rotation speed and so on, are input. The engine control unit 10 executes the start or automatic stop of the engine 1, based on the variety of signals given above.

Note that, instead of the master cylinder pressure sensor 13, a sensor to detect the amount of brake pedal stroke and the force with which the brake pedal is stepped on, a sensor to detect the wheel cylinder pressure, and so on may be used as well. That is, by detecting the amount of brake pedal operation (the amount of brake operation) using these sensors, it is possible to detect the driver's intention regarding braking operation, and the master cylinder pressure sensor 13 is by no means limiting.

The CVT control unit 20 transmits and receives signals of the engine working conditions and the CVT conditions between the CVT control unit 20 and the engine control unit 10, and, based on these signals, controls the transmission ratio of the belt-type continuously-variable transmission 3 and so on. To be more specific, when a driving range is selected, the CVT control unit 20 engages the starter clutch, and, furthermore, determines the transmission ratio from a transmission ratio map based on the accelerator pedal opening and vehicle speed, and controls each pulley pressure. Also, when the vehicle speed is lower than the predetermined vehicle speed CSVSP1, the CVT control unit 20 disengages the lockup clutch, and, when the vehicle speed is equal to or greater than the predetermined vehicle speed CSVSP1, engages the lockup clutch to place the engine 1 and the belt-type continuously-variable transmission 3 in a directly coupled state. Furthermore, when the engine stops automatically while a driving range is selected, the CVT control unit 20 activates the electric oil pump 31 and secures the required hydraulic pressure.

(Engine Automatic Control Process)

Next, the engine automatic control process will be described. The vehicle engine automatic control device (engine control unit 10) of present embodiment 1 stops engine idling when predetermined conditions hold (various conditions such as that the brake pedal is stepped on sufficiently) while the vehicle is stopped—that is, the engine automatic control device performs what may be referred to as idling stop control. Note that the idling stop control has only to implement public-domain configurations as appropriate, and therefore detailed descriptions thereof will be omitted. In addition, coast stop control, by which the engine 1 is stopped, even while the vehicle is driving, if the vehicle is decelerating and is decided to be highly likely to stop and shift to idling stop control via decelerating fuel cut control in the course of time, is executed.

That is to say, in what may be referred to as the coast driving state (including the state in which the brake pedal is operated), in which the driver does not operate the accelerator pedal but the vehicle keeps driving by inertia, fuel injection is stopped. During this decelerating fuel cut control, fuel injection is stopped, and, furthermore, the engine rotation speed is maintained by the coast torque that is transmitted from the drive wheels 4, via the lockup clutch. However, since the lockup clutch is disengaged upon deceleration down to the predetermined vehicle speed CSVSP1, the engine 1 stops unless fuel is injected. So, conventionally, at the time the lockup clutch is disengaged, decelerating fuel cut control is suspended, fuel injection is resumed, and the engine's self-sustaining rotation is maintained, and, furthermore, after the vehicle stops completely, engine idling is stopped. However, in the above step of from the driving state in which fuel injection is stopped, resuming fuel injection once and then stopping the engine again in this way, mileage can be improved if the fuel upon resuming fuel injection can be reduced even more. So, with the coast stop control according to present embodiment 1, when predetermined conditions hold, fuel injection is not resumed, and it is possible to keep the engine 1 stopped (without fuel injection and so on), and, after the vehicle stops, shift to normal idling stop control in the course of time.

One condition for executing coast stop control is that the amount of brake pedal operation by the driver is within a predetermined range. The reason that the amount of brake pedal operation is made one of the conditions is that coast stop control should be started or finished (suspended) based on the driver's intention of braking. That is, when the amount of brake pedal operation is equal to or greater than a predetermined value, it is possible to assume the driver's intention for braking, and, given that the vehicle is highly likely to stop and shift to idling stop control in the course of time, the engine 1 that is working is stopped and the coast stop control is started. After the coast stop control is started, when the amount of brake pedal operation decreases and falls below the above predetermined value, it is possible to assume the driver's intention for not to braking (intention to continue driving), and therefore the engine 1 that is stopped is re-started, and the coast stop control is finished (suspended).

Also, according to embodiment 1, to use as a threshold for the amount of brake pedal operation for restarting the engine (for finishing the coast stop control) after the engine is stopped, not only the above predetermined value (the decreasing-side threshold for the amount of brake pedal operation) is provided, but also a second threshold (the increasing-side threshold for the amount of brake pedal operation), which is greater than the above predetermined value, is provided. That is, after the coast stop control is started, if the amount of brake pedal operation increases and becomes equal to or greater than the second threshold, the engine 1 is re-started. In this way, as conditions to start and finish the coast stop control, thresholds for the brake pedal operation are provided separately between the decreasing side and the increasing side of the amount of brake pedal operation, and when the amount of brake pedal operation is in a predetermined range sandwiched between the above two thresholds (between the second threshold (the upper limit value) and the above predetermined value (the lower limit value)), the coast stop control is executed.

The second threshold (the upper limit value) is provided for various reasons such as follows:

(1) In a vehicle having a brake masterback that multiplies the force to operate the brake pedal by utilizing the negative pressure produced by the rotation of the engine 1, if the engine is kept stopped when the amount of brake pedal operation increases during coast stop control, it is not possible to use the negative pressure produced by the rotation of the engine, and therefore there is a possibility that the driver's intended braking force cannot be achieved sufficiently.

(2) When the brake pedal is stepped on hard, it is likely that the vehicle is decelerating rapidly and the time before the vehicle stops is short. At this time, it is necessary to make a gear change of the transmission ratio of the variable transmission (the belt-type continuously-variable transmission 3) before the vehicle stops (that is, while the drive wheels 4 are rotating, and the variable transmission is able to make gear changes) to the low gear at the time of the start (the lowest side). In a vehicle having a variable transmission that makes gear changes by utilizing the delivery pressure of the oil pump 30 that is driven by the engine 1, it is necessary to secure the amount of delivery of the oil pump 30 in order to make quick gear changes before the vehicle stops, as described above. Especially, gear changes with the belt-type continuously-variable transmission 3 require supply of comparatively high pulley pressures. Consequently, it is not preferable to stop the engine 1, which is the driving source of the oil pump 30. Note that, although it may be possible to change gears by hydraulic pressures to be supplied from the electric oil pump 31, it is necessary to make the electric oil pump 31 big in order to make gear changes quickly, and this is not desirable.

(3) When the vehicle decelerates rapidly, various types of controls for stabilizing the vehicle's behavior may be involved. For example, according to ABS control for avoiding wheel lockup, to increase and decrease the brake liquid pressure to work on the wheels, the torque input from the engine 1 side is also taken into account, and various gains and so on are set in the control logic. Also, when the amount of slip is large, there is a possibility that the traction control system to reduce the engine torque and so on may be activated. Consequently, when the engine is stopped carelessly, influence upon these controls also becomes a concern.

Consequently, an engine stop determination threshold (the upper limit value BRKIN for the amount of brake pedal operation to allow coast stop control) that takes into account the above circumstances (not necessarily all, and taking into account part of the above circumstances is also possible) is set. The engine 1 is stopped when the amount of brake pedal operation falls below the above threshold (the upper limit value BRKIN), and the engine is restarted when the amount of brake pedal operation becomes equal to or greater than the above threshold (the upper limit value BRKIN).

To consider the decreasing-side threshold (the above predetermined value=the lower limit value), upon soft deceleration in which the brake pedal is stepped on softly, the case of stopping the vehicle on an as-is basis and the case of releasing the brake pedal again and re-starting again, are possible. For example, when driving in a traffic jam, it may be possible to operate the brake pedal softly and continue the driving state. In this case, if the engine 1 is stopped carelessly, there is a possibility that it may be not possible to utilize the creep torque produced by the engine 1, and also that the engine keeps being stopped and re-started and gives the driver a sense of discomfort.

Also, after the engine stops, if the engine is re-started while the brake pedal is kept stepped on softly, engine torque is output to the drive wheels 4, and this may give a jumpy feeling. Meanwhile, on the upward gradient, if the threshold for the amount of brake pedal operation for re-starting the engine is too low, the engine is re-started after the braking force by the brake pedal becomes small, and therefore there is a possibility that the vehicle may move backward a little.

Furthermore, while driving at a reduced speed before stopping the vehicle, the amount of brake pedal operation by the driver changes, and the amount of brake pedal operation is likely to be smaller as the vehicle speed becomes lower. For example, when the driver wants to stop the vehicle slowly such as when trying to stop for the red light, the brake fluid pressure that is required for deceleration becomes smaller as the vehicle speed lowers, so that the driver makes the amount of brake pedal operation smaller. Here, if the engine 1 is re-started carelessly in accordance with the decrease of the amount of brake pedal operation, the engine 1 is re-started against the driver's intention to stop the vehicle, and therefore there is a possibility that mileage cannot be improved sufficiently.

Consequently, an engine start determination threshold to take into account the variety of circumstances given above (the lower limit value BRKOUT for the amount of brake pedal operation to allow coast stop control) is set. The engine 1 is stopped when the amount of brake pedal operation is equal to or greater than the above threshold (the lower limit value BRKOUT), and the engine 1 is re-started when the amount of brake pedal operation falls below the above threshold (the lower limit value BRKOUT).

Note that, in order to minimize switching between stopping the engine and re-starting the engine frequently, it may be possible to provide a hysteresis for each of the above upper limit value BRKIN and lower limit value BRKOUT.

[Engine Automatic Stop/Re-Start Control Process]

Figure 2:
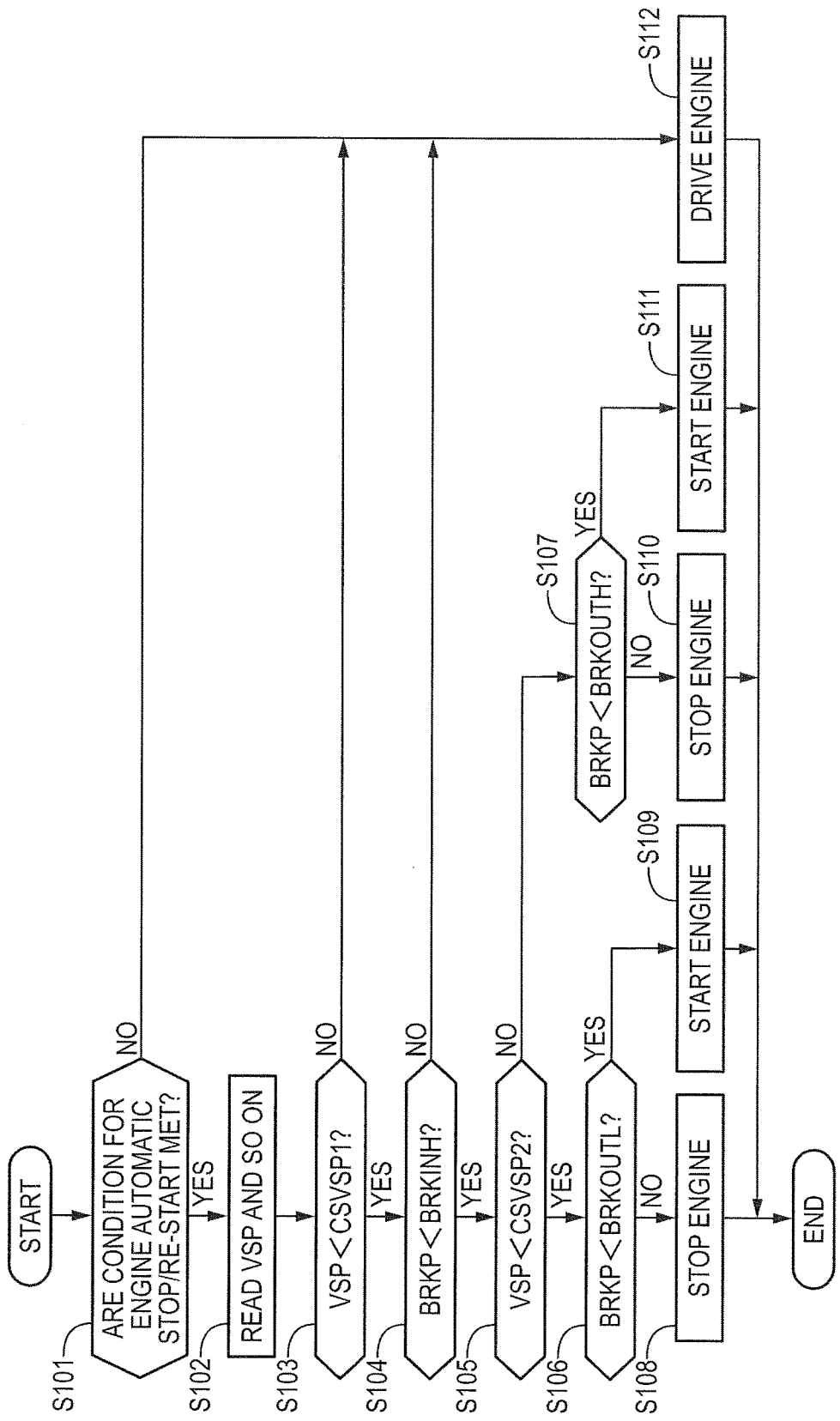
FIG. 2 is a flowchart showing an engine automatic stop/re-start control process according to embodiment 1.

FIG. 2 is a flowchart showing the engine automatic stop/re-start control process that is executed in the engine control unit 10 according to embodiment 1. This process is executed repeatedly per predetermined cycle while driving. Whether or not the vehicle is driving is decided based on, for example, whether the vehicle speed VSP becomes equal to or lower than a predetermined value VSP0, which represents the state in which the vehicle is stopped. The predetermined value VSP0 may be zero or may be in a very low vehicle speed range such as 1 to 2 km/h, as long as the vehicle can be determined to be virtually stopped at that value. Note that other conditions that are not shown in this flowchart may be added and set as appropriate.

In step S101, whether or not the conditions to allow the engine automatic stop/re-start control are met—to be more specific, whether or not the coast driving state (in which the amount of accelerator pedal operation is zero) is assumed and whether or not the brake pedal is being operated—is decided. When the amount of accelerator pedal operation is zero and the brake pedal is being operated, the step moves on to step S102, and, otherwise, the step moves on to step S112 and the engine working conditions are retained.

In step S102, the vehicle speed VSP, the amount of brake pedal operation (the master cylinder pressure) BRKP, the upper limit value (the idling stop allowing upper limit value) and lower limit value (the idling stop allowing lower limit value) for the amount of brake pedal operation BRKP to allow idling stop control, and the upper limit value (the coast stop allowing upper limit value BRKIN) and lower limit value (the coast stop allowing lower limit value BRKOUT) for the amount of brake pedal operation BRKP to allow coast stop control are read, and the step moves on to step S103.

The vehicle speed VSP is not particularly limited, and may be an average value of each wheel speed detected by the wheel speed sensors 14, or may be an average value of the wheel speed of the driven wheels.

The idling stop allowing upper limit value is a value that is set in advance in the system, and is assumed to be a fixed value in embodiment 1.

The coast stop allowing upper limit value BRKIN is a value that is set in the system in advance, and is set to a fixed value BRKINH in embodiment 1.

The coast stop allowing lower limit value BRKOUT is set smaller as the vehicle speed VSP lowers. According to embodiment 1, to use as the coast stop allowing lower limit value BRKOUT, there are a high vehicle speed range coast stop allowing lower limit value BRKOUTH to use when the vehicle speed VSP is high (CSVSP2≤VSP<CSVSP1), and a low vehicle speed range coast stop allowing lower limit value BRKOUTL to use when the vehicle speed VSP is low (VSP0<VSP<CSVSP2). The low vehicle speed range coast stop allowing lower limit value BRKOUTL is set to a smaller value than the high vehicle speed range coast stop allowing lower limit value BRKOUTH (BRKOUTL<BRKOUTH<BRKINH).

The idling stop allowing lower limit value is set to a greater value than the coast stop allowing lower limit value BRKOUT (for example, BRKOUTL). This is because the state in which idling stop is executed is the state in which the vehicle is stopped, and, if the engine is started in this state, although creep torque is output, given that the braking force by the brake is low in this state, there is a possibility that the vehicle might move unexpectedly due to this creep torque. Also, the state in which coast stop is made is one in which the vehicle is decelerating (that is, during drive). In this state, improving mileage as much as possible by stopping the engine is intended, so that, even if the engine 1 is re-started before the vehicle stops, as long as the vehicle is driving, the driver is little likely to feel a jumpy feeling due to creep torque.

In step S103, whether or not the vehicle speed VSP falls below the upper limit value CSVSP1 for allowing the coast stop control is decided. When the vehicle speed VSP falls below the upper limit value CSVSP1, the step moves on to step S104, and, otherwise, the step moves on to step S112 and the engine working conditions are retained.

In step S104, whether or not the amount of brake pedal operation BRKP falls below the coast stop allowing upper limit value BRKINH is decided. When the amount of brake pedal operation BRKP falls below the upper limit value BRKINH, the step moves on to step S105, and, otherwise, the step moves on to step S112 and the engine working conditions are retained.

In step S105, whether or not the vehicle speed VSP falls below the predetermined value CSVSP2, which is set smaller than the coast stop allowing upper limit value CSVSP1, is decided. When the vehicle speed VSP falls below the predetermined value CSVSP2, the vehicle speed is decided to be low and the step moves on to step S106, and, otherwise, the vehicle speed is decided to be high and the step moves on to step S107. That is, the predetermined value CSVSP2 is a vehicle speed threshold for deciding whether the vehicle speed is high or low, and switching between the high vehicle speed range coast stop allowing lower limit value BRKOUTH and the low vehicle speed range coast stop allowing lower limit value BRKOUTL.

In step S106, whether or not the amount of brake pedal operation BRKP falls below the low vehicle speed range coast stop allowing lower limit value BRKOUTL is decided. When the amount of brake pedal operation BRKP falls below the low vehicle speed range coast stop allowing lower limit value BRKOUTL, the step moves on to step S109 and the engine is re-started, and, otherwise, the step moves on to step S108 and the engine is stopped.

In step S107, whether or not the amount of brake pedal operation BRKP falls below the high vehicle speed range coast stop allowing lower limit value BRKOUTH is decided. When the amount of brake pedal operation BRKP falls below the high vehicle speed range coast stop allowing lower limit value BRKOUTH, the step moves on to step S111 and the engine is re-started, and, otherwise, the step moves on to step S110 and the engine is stopped.

[Operation]

Figure 3:
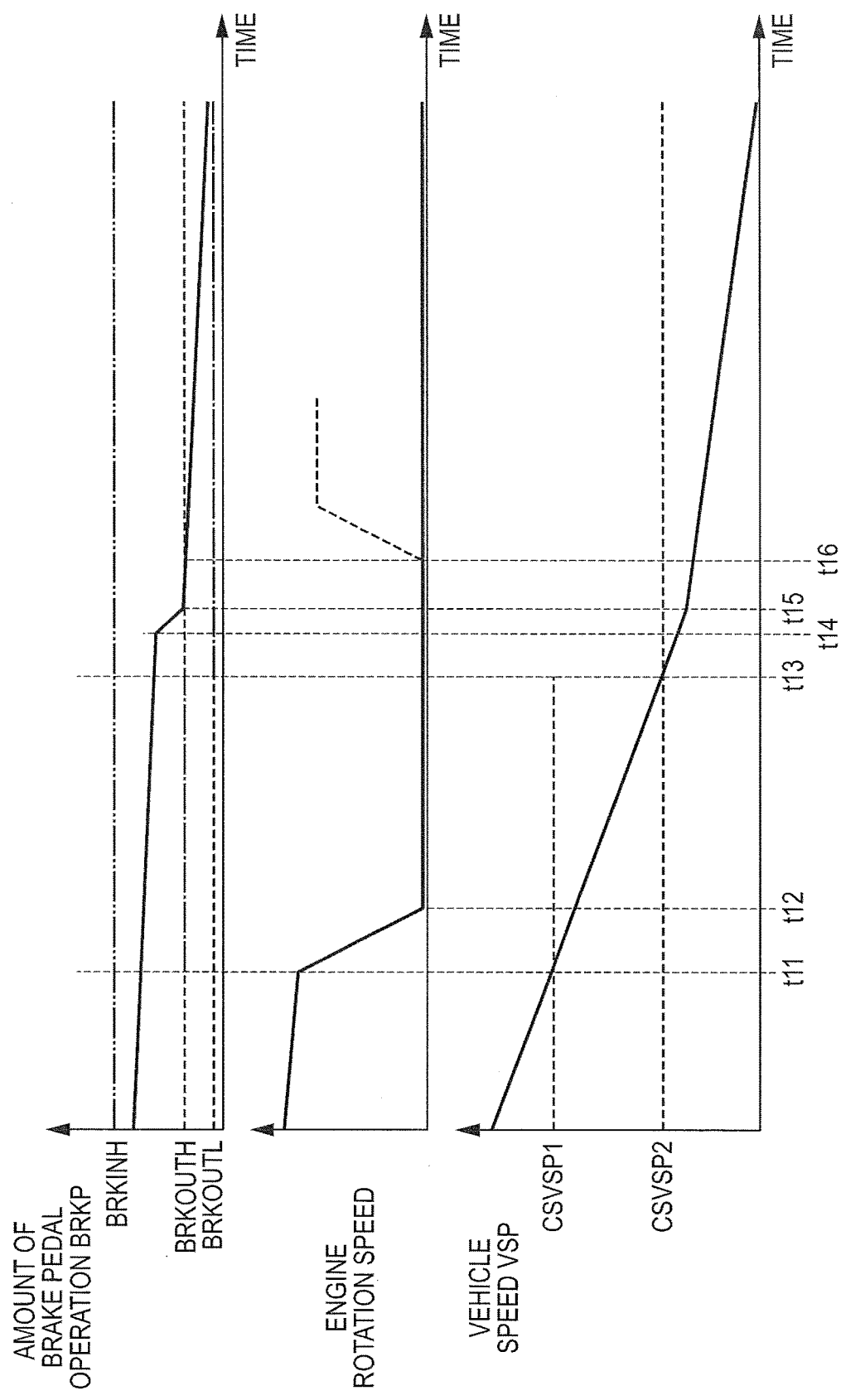
FIG. 3 is a time chart showing an operation of a process of setting a coast stop allowing lower limit value upon coast drive, according to embodiment 1.

Next, the operation based on the above control process will be described using comparative examples. FIG. 3 is a time chart showing the operation of the process of setting the coast stop allowing lower limit value BRKOUT upon coast drive, according to embodiment 1. The driving conditions at the first time in this time chart (presumed conditions) assume the coast driving state, in which the driver's foot is released from the accelerator pedal while driving.

When the Coast Stop Allowing Lower Limit Value BRKOUT is Changed in Accordance with the Vehicle Speed: Embodiment 1

First, the operation of embodiment 1 will be described.

At and before time t11, the driver steps on the brake pedal, and although the conditions to allow the engine automatic stop/re-start control are met, the vehicle speed VSP is equal to or greater than the coast stop allowing upper limit value CSVSP1. Consequently, the control process of FIG. 2 follows the flow of steps S101→S102→S103→S112, and the coast stop control is not executed. The engine 1 retains the working conditions. The amount of brake pedal operation BRKP (the solid line in FIG. 3) by the driver decreases gradually.

At time t11, the vehicle speed VSP falls below the coast stop allowing upper limit value CSVSP1 (CSVSP2<VSP<CSVSP1). Also, the amount of brake pedal operation BRKP falls below the coast stop allowing upper limit value BRKINH (the two-dot chain line in FIG. 3) (BRKOUTH≤BRKP<BRKINH). Consequently, the steps follow the flow of steps S101→S102→S103→S104→S105→107→S110, and the engine 1 (fuel injection) is stopped. In this way, after time t11 to start coast stop, the engine rotation speed decreases rapidly toward zero.

At time t12, the engine rotation speed becomes virtually zero.

At time t13, the vehicle speed VSP falls below the predetermined value CSVSP2 (VSP0<VSP<CSVSP2). Consequently, the steps follow the flow of steps S101→S102→S103→S104→S105→S106, and the coast stop allowing lower limit value BRKOUT (the one-dot chain line in FIG. 3) switches from the high vehicle speed range coast stop allowing lower limit value BRKOUTH to the low vehicle speed range coast stop allowing lower limit value BRKOUTL. Since the amount of brake pedal operation BRKP is equal to or greater than the low vehicle speed range coast stop allowing lower limit value BRKOUTL (BRKOUTL≤BRKP<BRKOUTH), the steps follow the flow of steps S106→S108, and the engine is kept stopped.

At times t14 and t15, the driver softens the step on the brake pedal stepwise (the amount of brake pedal operation BRKP rapidly becomes smaller). Accompanying this, at and after times t14 and t15, the decreasing gradient of the vehicle speed VSP (the amount of decrease per time) decreases.

At and after time t15, the decreasing gradient of the amount of brake pedal operation BRKP becomes small again. Since the amount of brake pedal operation BRKP is still equal to or greater than the low vehicle speed range coast stop allowing lower limit value BRKOUTL (BRKOUTL≤BRKP<BRKOUTH), the steps follow the flow of steps S106→S108, and the engine is kept stopped.

When the Coast Stop Allowing Lower Limit Value BRKOUT is Made a Fixed Value Regardless of the Vehicle Speed: Comparative Example Next, the operation of a comparative example in which the coast stop allowing lower limit value BRKOUT is not changed in accordance with the vehicle speed VSP and made a fixed value (for example, BRKOUTH) will be described.

Up to time t13, the same will apply as present embodiment 1.

At time t13, the vehicle speed VSP falls below the predetermined value CSVSP2 (VSP0<VSP<CSVSP2). However, even after time t13, the coast stop allowing lower limit value BRKOUT is set to the high vehicle speed range coast stop allowing lower limit value BRKOUTH, like up to time t13 (the broken line in FIG. 3).

At time t16, the amount of brake pedal operation BRKP falls below the high vehicle speed range coast stop allowing lower limit value BRKOUTH, so that the engine 1 is re-started. As shown with the broken line in FIG. 3, after time t16, the engine rotation speed increases. Consequently, although, with the comparative example, the driver intends to stop the vehicle and it is possible to stop fuel injection by executing the coast stop control, the engine 1 is re-started, and therefore it is not possible to improve mileage sufficiently.

By contrast with this, with embodiment 1, as described above, the coast stop allowing lower limit value BRKOUT is set smaller as the vehicle speed VSP lowers (steps S103 to S107). Consequently, even when the amount of brake operation changes in accordance with the vehicle speed VSP, it is still possible to re-start the engine 1 in a more appropriate, timelier manner in accordance with the driver's intention, so that mileage can be improved better.

As described above, with embodiment 1, the following advantages can be achieved.

(1) A brake operation amount detecting means (the master cylinder pressure sensor 13) that detects the amount of brake operation by the driver (the master cylinder pressure), an engine stopping/re-starting means (the engine control unit 10) that, during coast drive, stops the engine 1 based on the amount of brake operation that is detected, and, after the engine stops, restarts the engine 1 when the amount of brake operation that is detected falls below the first threshold (the coast stop allowing lower limit value BRKOUT), and a first threshold setting means that sets the first threshold smaller as the vehicle speed VSP lowers (steps S103 to S107), are provided.

Consequently, even when the amount of brake operation changes in accordance with the vehicle speed VSP, it is still possible to re-start the engine 1 in a more appropriate, timelier manner in accordance with the driver's intention, so that mileage can be improved better.

(2) During coast drive, after the engine stops, the engine stopping/re-starting means (the engine control unit 10) re-starts the engine 1 when the amount of brake operation (the master cylinder pressure) that is detected becomes equal to or greater than the second threshold (the coast stop allowing upper limit value BRKIN).

Consequently, when the amount of brake pedal operation increases during the coast stop control (engine stop), by re-starting the engine 1, it is possible to improve the braking performance of the vehicle and allow smooth braking.

Embodiment 2

Figure 4:
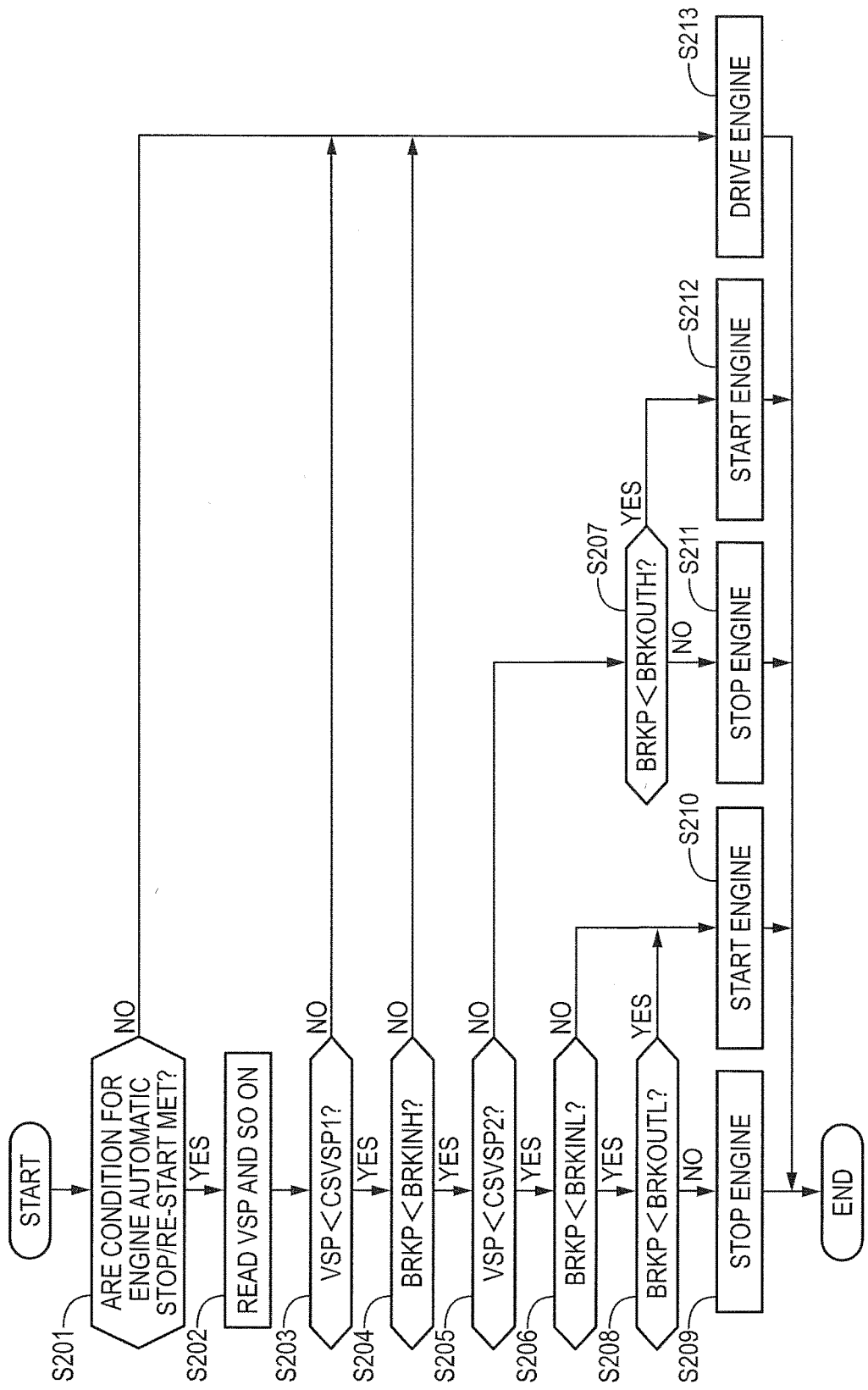
FIG. 4 is a flowchart showing an engine automatic stop/re-start control process according to embodiment 2.

Next, embodiment 2 will be described. The basic configuration is the same as embodiment 1, so that the different points alone will be described. FIG. 4 is a flowchart showing the engine automatic stop/re-start control process that is executed in the engine control unit 10 according to embodiment 2.

With embodiment 2, similar to the coast stop allowing lower limit value BRKOUT, the coast stop allowing upper limit value BRKIN is set smaller as the vehicle speed VSP lowers. As the coast stop allowing upper limit value BRKIN, there are a high vehicle speed range coast stop allowing upper limit value BRKINH to use when the vehicle speed VSP is high (CSVSP2≤SP<CSVSP1), and a low vehicle speed range coast stop allowing upper limit value BRKINL to use when the vehicle speed VSP is low (VSP0<VSP<CSVSP2). The low vehicle speed range coast stop allowing upper limit value BRKINL is set to a smaller value than the high vehicle speed range coast stop allowing upper limit value BRKINH (BRKOUTH<BRKINL<BRKINH).

Steps S201 to S205 are the same as steps S101 to S105 of FIG. 2. In step S204, whether or not the amount of brake pedal operation BRKP falls below the high vehicle speed range coast stop allowing upper limit value BRKINH is decided.

In step S206, whether or not the amount of brake pedal operation BRKP falls below the low vehicle speed range coast stop allowing upper limit value BRKINL is decided. When the amount of brake pedal operation BRKP falls below the upper limit value BRKINL, the step moves on to step S208, and, otherwise, the step moves on to step S210 and the engine is re-started. Step S208 is the same as step S106 of FIG. 2.

Steps S207 and S209 to S213 are the same as steps S107 and S108 to S112 of FIG. 2, respectively.

[Operation]

Figure 5:
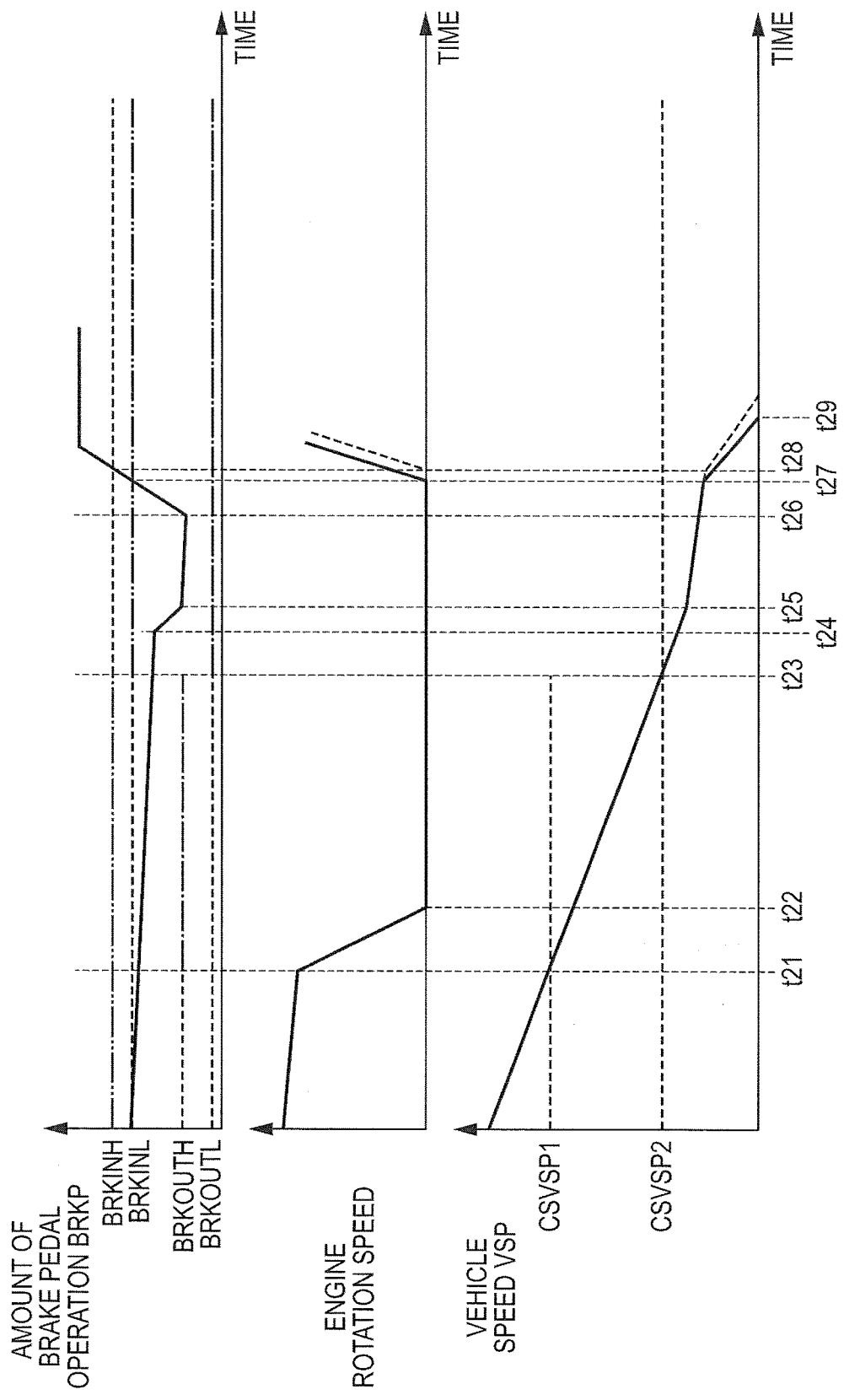
FIG. 5 is a time chart showing an operation of a process of setting a coast stop allowing upper limit value and lower limit value upon coast drive, according to embodiment 2.

Next, the operation based on the above control process will be described using comparative examples. FIG. 5 is the same time chart as in embodiment 1 (FIG. 3), showing the operation of the process of setting the coast stop allowing upper limit value BRKIN and the lower limit value BRKOUT during coast drive, according to embodiment 2.

When the Coast Stop Allowing Upper Limit Value BRKIN is Changed in Accordance with the Vehicle Speed: Embodiment 2

The same as up to time t13 in embodiment 1 of FIG. 3 will apply up to time t23.

At time t23, the vehicle speed VSP falls below the predetermined value CSVSP2 (VSP0<VSP<CSVSP2). Consequently, the control process of FIG. 4 follows the flow of steps S201→S202→S203→S204→S205→S206, and the coast stop allowing lower limit value BRKOUT switches to the low vehicle speed range coast stop allowing lower limit value BRKOUTL, and, furthermore, the coast stop allowing upper limit value BRKIN switches from the high vehicle speed range coast stop allowing upper limit value BRKINH to the low vehicle speed range coast stop allowing upper limit value BRKINL. Since the amount of brake pedal operation BRKP is smaller than the low vehicle speed range coast stop allowing upper limit value BRKINL and is equal to or greater than the low vehicle speed range coast stop allowing lower limit value BRKOUTL (BRKOUTLL≤BRKP<BRKINL), the steps follow the flow of steps S206→S208→S209, and the engine is kept stopped.

The same as times t13 to t16 in embodiment 1 of FIG. 3 will apply from time t23 up to just before time t26.

At time t26, the driver steps on the brake pedal rapidly. After time t26, the amount of brake pedal operation BRKP increases.

At time t27, the amount of brake pedal operation BRKP becomes equal to or greater than the low vehicle speed range coast stop allowing upper limit value BRKINL (BRKINL≤BRKP<BRKINH). Consequently, the steps follow the flow of steps S201→S202→S203→S204→S205→S206→S210, and, to re-start the engine, at and after time t27, the engine rotation speed increases. Also, following the increase of the engine rotation speed, an engine negative pressure is produced and a braking force to utilize the brake masterback is produced, so that the vehicle speed VSP decreases in a greater gradient and the vehicle decelerates rapidly. Also, while the engine is stopped at times t21 to t27, the supply of power, which has been cut off because the alternator 1b is not driven—for example, charging of the in-vehicle battery 1c—is started again. Also, accompanying the increase of the engine rotation speed, the amount of delivery of the oil pump 30 is secured and the transmission controllability of the belt-type continuously-variable transmission 3 improves, so that it is possible to change gears quickly.

At time t29, the vehicle speed VSP becomes virtually zero or VSP0, and the vehicle stops. Before time t29, the transmission ratio of the belt-type continuously-variable transmission 3 undergoes gear changes to the lowest side.

When the Coast Stop Allowing Upper Limit Value BRKIN is Made a Fixed Value Regardless of the Vehicle Speed: Comparative Example Next, the operation of a comparative example in which the coast stop allowing upper limit value BRKIN is not changed in accordance with the vehicle speed VSP and is made a fixed value (for example, BRKINH) will be described.

The same as embodiment 2 will apply up to time t23.

At time t23, the vehicle speed VSP falls below a predetermined value CSVSP2 (VSP0<VSP<CSVSP2). However, even after time t23, the coast stop allowing upper limit value BRKIN is set to the high vehicle speed range coast stop allowing upper limit value BRKINH, like up to time t23 (the broken line in FIG. 5).

After time t26, the amount of brake pedal operation BRKP increases. Since the coast stop allowing upper limit value BRKIN is set to the high vehicle speed range coast stop allowing upper limit value BRKINH, at time t28, which comes later than time t27 (the time to re-start the engine in embodiment 2), the amount of brake pedal operation BRKP becomes equal to or greater than the high vehicle speed range coast stop allowing upper limit value BRKINH, and the engine 1 is re-started. As shown with the broken line of FIG. 5, after time t28, the engine rotation speed increases.

In this way, with the comparative example, the engine rotation speed starts increasing later than time t27, and therefore the securing of engine negative pressure generation (multiplication of force by the brake masterback) also becomes late, and, after time t28, the vehicle speed VSP starts decreasing rapidly. Also, since the securing of the amount of delivery of the oil pump 30 becomes late, there is a possibility that it is not possible to secure sufficient transmission controllability with the belt-type continuously-variable transmission 3, and it is therefore not possible to allow the transmission ratio of the belt-type continuously-variable transmission 3 to undergo gear changes to the lowest side before the vehicle stops. When the coast stop allowing lower limit value BRKOUT is lowered in accordance with the vehicle speed VSP, the engine 1 is re-started at a point in time when the vehicle speed is low—that is, at a point in time when the time before the vehicle stops is short—and therefore this in particular poses a problem.

By contrast with this, with embodiment 2, as described above, the coast stop allowing upper limit value BRKIN is set smaller as the vehicle speed VSP lowers (steps S203 to S206). Consequently, even if the amount of brake operation increases while the vehicle speed VSP is low, it is possible to re-start the engine 1 more quickly, so that it is possible to secure negative pressure generation by the engine 1 quickly, and improve the braking performance of the vehicle by utilizing the brake masterback.

Also, it is possible to improve the transmission controllability of the belt-type continuously-variable transmission 3. As in embodiment 1, when the coast stop allowing lower limit value BRKOUT is lowered in accordance with the vehicle speed VSP, the engine 1 is re-started at a point in time when the vehicle speed is low—that is, at a point in time when the time before the vehicle stops is short—improvement of transmission controllability is particularly effective. Note that it may be possible to use, for example, a stepwise variable transmission as a variable transmission, and, as long as the variable transmission changes gears by utilizing the delivery pressure of a pump (the oil pump 30) driven by the engine 1, the above operations and advantages can be achieved. Since the belt-type continuously-variable transmission 3 to require supply of comparatively high delivery pressures (pulley pressures) for gear changes is used with embodiment 1, this is particularly effective to improve transmission controllability.

Also, even when various controls are involved for stabilization of the vehicle's behavior when the vehicle decelerates rapidly, it is possible to reduce the influence upon these controls by activating the engine 1 early.

Furthermore, by activating the alternator 1b early, it is possible to increase the supply of power to the in-vehicle battery 1c and so on.

As described above, with embodiment 2, in addition to (1) and (2) above, the following advantage can be achieved.

(3) A second threshold setting means that sets the second threshold (the coast stop allowing upper limit value BRKIN) smaller as the vehicle speed VSP lowers (steps S203 to S206) is provided.

Consequently, even if the amount of brake operation increases while the vehicle speed VSP is low, it is possible to re-start the engine 1 more quickly, so that it is possible to make the braking of the vehicle smoother.

Embodiment 3

Figure 6:
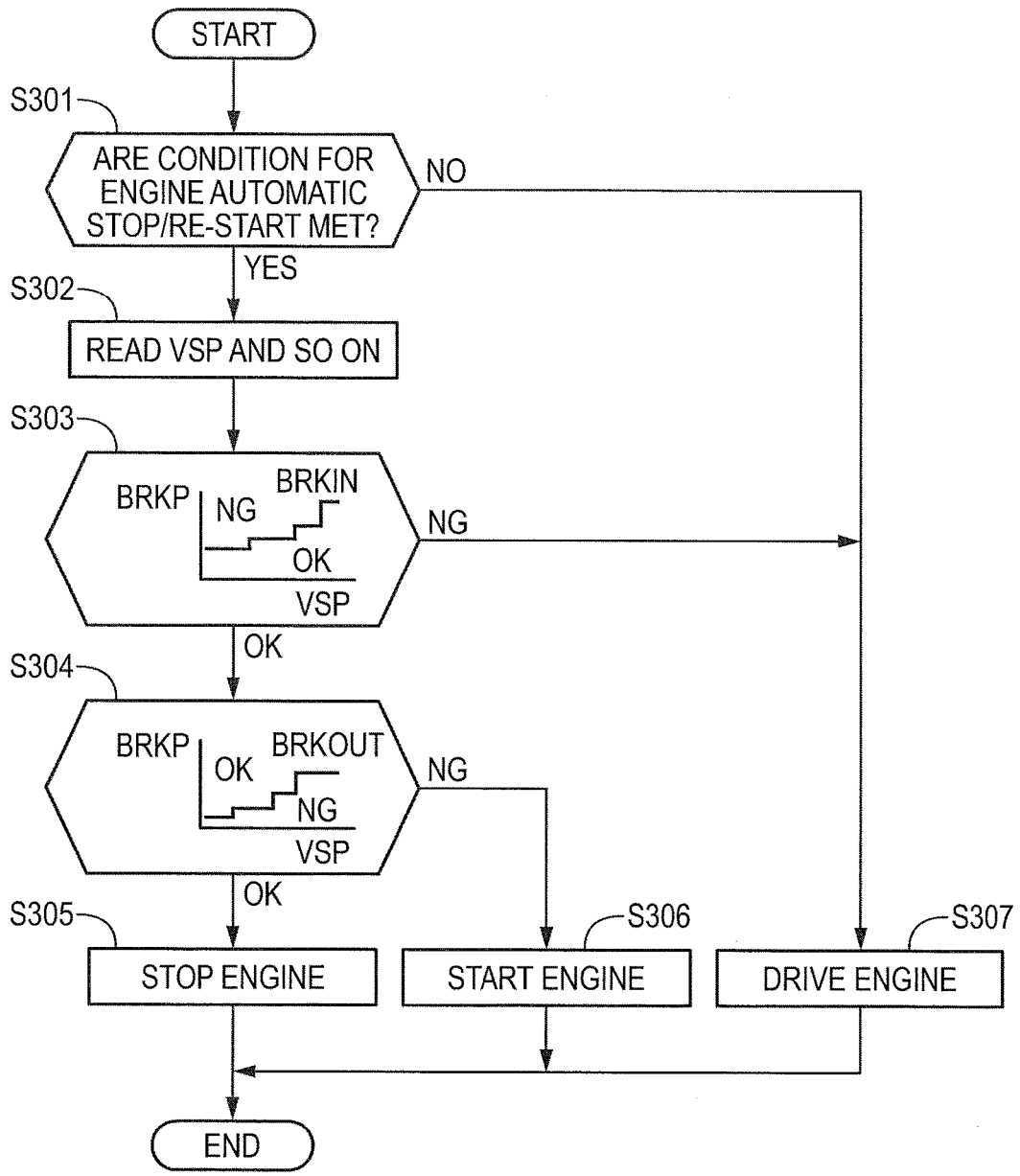
FIG. 6 is a flowchart showing an engine automatic stop/re-start control process according to embodiment 3.

Next, embodiment 3 will be described. The basic configuration is the same as embodiment 1, so that the different points alone will be described. FIG. 6 is a flowchart showing the engine automatic stop/re-start control process executed in the engine control unit 10 according to embodiment 3.

With embodiment 3, similar to embodiment 2, the coast stop allowing upper limit value BRKIN and the coast stop allowing lower limit value BRKOUT are set smaller as the vehicle speed VSP lowers. The engine control unit 10 has a map 1 to represent the relationship between the coast stop allowing upper limit value BRKIN and the vehicle speed VSP, and a map 2 to represent the relationship between the coast stop allowing lower limit value BRKOUT and the vehicle speed VSP.

In the map 1, as shown in step S303 of FIG. 6, a border line is drawn such that the coast stop allowing upper limit value BRKIN decreases stepwise (in steps) as the vehicle speed VSP changes from the higher side to the lower side. This border line separates between the coast stop allowing (OK) area and the coast stop disallowing (NG) area. Whether to allow or disallow coast stop (engine stop) is decided depending on which area the driving conditions as of then (the vehicle speed VSP and the amount of brake pedal operation BRKP) belong to.

The map 2 has the same format as the map 1, and, a border line is drawn such that the coast stop allowing lower limit value BRKOUT decreases stepwise (in steps) as the vehicle speed VSP changes from the higher side to the lower side. This border line separates between the coast stop allowing (OK) area and the coast stop disallowing (NG) area.

In step S301, whether or not the conditions to allow the engine automatic stop/re-start control are met—to be more specific, whether or not conditions such as that the coast driving state is assumed, that the brake pedal is being operated, and so on are met—is determined. When the allowing conditions are met, the step moves on to step S302, and, otherwise, the step moves on to step S307 and the engine's working conditions are retained.

In step S302, the vehicle speed VSP, the amount of brake pedal operation (the master cylinder pressure) BRKP, the upper limit value and lower limit value for the amount of brake pedal operation BRKP to allow the idling stop control, and the maps 1 and 2 are read, and the step moves on to step S303.

In step S303, which one of the coast stop allowing area and the coast stop disallowing area of the map 1 the driving conditions as of then (the vehicle speed VSP and the amount of brake pedal operation BRKP) belong to, is decided. When the driving conditions as of then are decided to belong to the coast stop allowing area, the step moves on to step S304, and, when the driving conditions as of then are decided to belong to the coast stop disallowing area, the step moves on to step S307, and the engine's working conditions are retained.

In step S304, which one of the coast stop allowing area and the coast stop disallowing area of the map 2 the driving conditions as of then (the vehicle speed VSP and the amount of brake pedal operation BRKP) belong to, is decided. When the driving conditions as of then are decided to belong to the coast stop allowing area, the step moves on to step S305 and the engine is stopped, and, when the driving conditions as of then are decided to belong to the coast stop disallowing area, the step moves on to step S306 and the engine is re-started.

[Operation]

Figure 7:
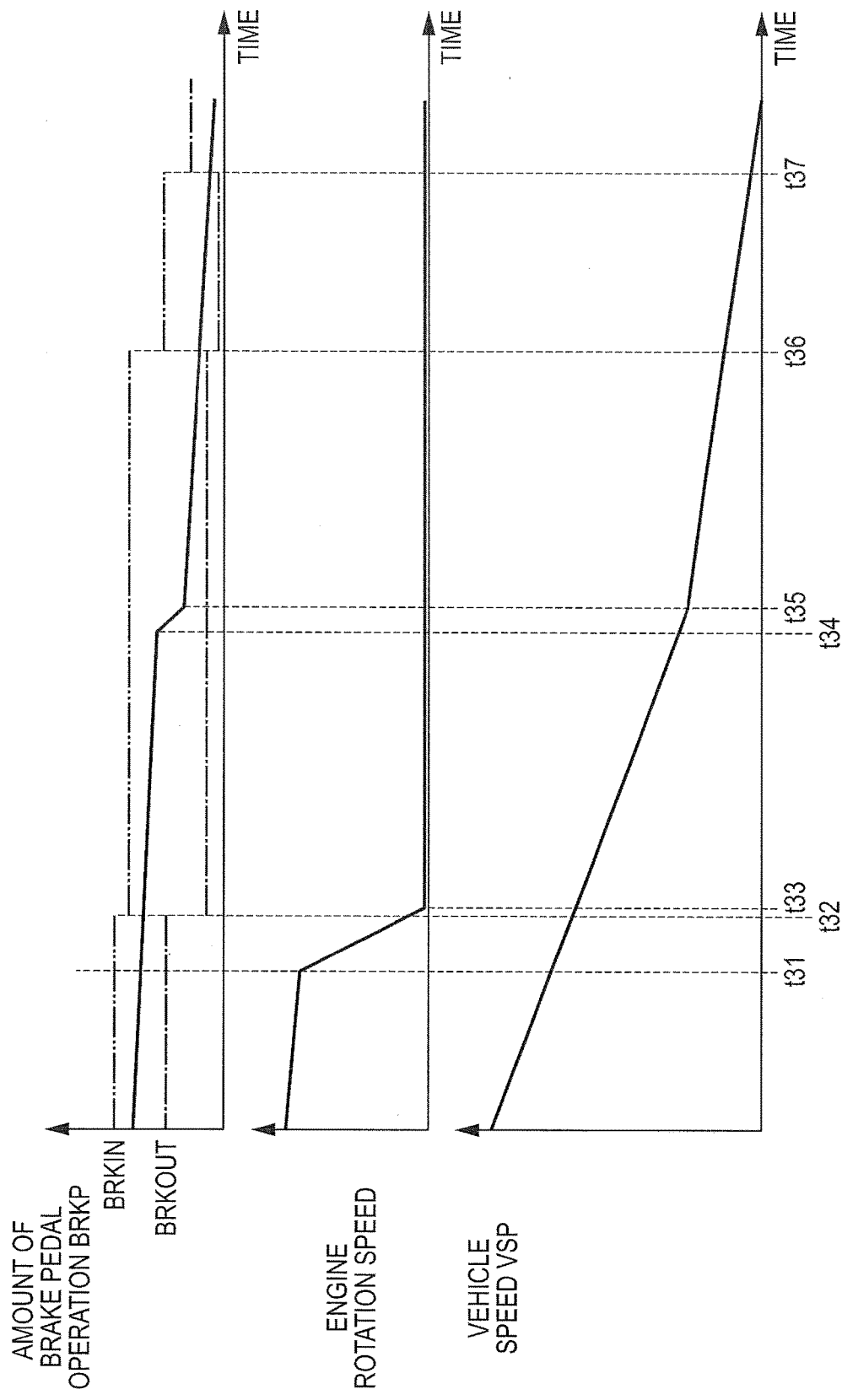
FIG. 7 is a time chart showing an operation of a process of setting a coast stop allowing upper limit value and lower limit value upon coast drive, according to embodiment 3.

Next, the operation based on the above control process will be described. FIG. 7 is the same time chart as for embodiment 1 (FIG. 3), showing the operation of the process of setting the coast stop allowing upper limit value BRKIN and lower limit value BRKOUT upon coast drive according to embodiment 3.

At and before time t31, although the driver steps on the brake pedal, the conditions to allow the engine automatic stop/re-start control are not met, and therefore the control process of FIG. 6 follow the flow of steps S301→S307, and the engine 1 is kept working. The amount of brake pedal operation BRKP by the driver decreases gradually.

At time t31, the conditions to allow the engine automatic stop/re-start control are met. Also, the driving conditions (the vehicle speed VSP and the amount of brake pedal operation BRKP) belong to the coast stop allowing area in the map 1 and the coast stop allowing area in the map 2. Consequently, the steps follow the flow of steps S301→S302→S303→S304→S305, and the engine 1 (fuel injection) is stopped. After time t31, at which coast stop is started, the engine rotation speed decreases rapidly toward zero.

At time t32, the coast stop allowing upper limit value BRKIN in the map 1 and the lower limit value BRKOUT in the map 2 each decrease stepwise (in steps) in accordance with the decrease of the vehicle speed VSP.

At time t33, the engine rotation speed becomes virtually zero.

At times t34 and t35, the driver softens the step on the brake pedal stepwise. Accompanying this, at and after times t34 and t35, the decreasing gradient of the vehicle speed VSP (the amount of decrease per time) decreases.

At times t36 and time t37, in accordance with the decrease of the vehicle speed VSP, the coast stop allowing upper limit value BRKIN and lower limit value BRKOUT in the maps 1 and 2 each decrease stepwise (in steps).

At and after time t31, the amount of brake pedal operation BRKP by the driver decreases. Parallel to this, the coast stop allowing lower limit value BRKOUT in the map 2 decreases in accordance with the decrease of the vehicle speed VSP, so that the amount of brake pedal operation BRKP is prevented from falling below the coast stop allowing lower limit value BRKOUT. In other words, the driving conditions (the vehicle speed VSP and the amount of brake pedal operation BRKP) stay in the coast stop allowing area in the map 2. Consequently, the steps follow the flow of steps S301→S302→S303→S304→S305, and the engine is kept stopped.

Also, since the coast stop allowing upper limit value BRKIN in the map 1 decreases in accordance with the decrease of the vehicle speed VSP at and after time t31, if the driver steps on the brake pedal, after that, the amount of brake pedal operation BRKP is likely to become equal to or greater than the coast stop allowing upper limit value BRKIN comparatively quickly. In other words, the driving conditions (the vehicle speed VSP and the amount of brake pedal operation BRKP) are likely to shift from the coast stop allowing area to the disallowing area in the map 1. Consequently, the engine is re-started more quickly.

With embodiment 3, a plurality of coast stop allowing lower limit values BRKOUT are set such that the coast stop allowing lower limit value BRKOUT becomes smaller as the vehicle speed VSP lowers. To be more specific, three or more coast stop allowing lower limit values BRKOUT are set, unlike embodiments 1 and 2 (in which two of the high vehicle speed range coast stop allowing lower limit value BRKOUTH and the low vehicle speed range coast stop allowing lower limit value BRKOUTL are set). In this way, by breaking down more finely and setting coast stop allowing lower limit values BRKOUT in accordance with the vehicle speed VSP, it is possible to prevent the coast stop allowing lower limit values BRKOUT from changing rapidly, and re-start the engine 1 in a more appropriate, timelier manner. Consequently, mileage can be improved better.

Also, the coast stop allowing lower limit values BRKOUT are set based on the map 2. Consequently, it is possible to improve the flexibility with the setting of the coast stop allowing lower limit values BRKOUT, and also alleviate the calculation load of the engine control unit 10 compared to the case where, for example, the coast stop allowing lower limit values BRKOUT are set based on algorithms.

Also, a plurality of coast stop allowing upper limit values BRKIN are set such that the coast stop allowing upper limit value BRKIN becomes smaller as the vehicle speed VSP lowers. To be more specific, three or more coast stop allowing upper limit values BRKIN are set unlike embodiment 2 (in which two of the high vehicle speed range coast stop allowing upper limit value BRKINH and the low vehicle speed range coast stop allowing upper limit value BRKINL are set). In this way, by breaking down more finely and setting coast stop allowing upper limit values BRKIN in accordance with the vehicle speed VSP, it is possible to prevent the coast stop allowing upper limit values BRKIN from changing rapidly, and re-start the engine 1 in a more appropriate, timelier manner. Consequently, it is possible to improve the braking performance of the vehicle and the transmission controllability of the belt-type continuously-variable transmission 3 more.

Also, by setting the coast stop allowing upper limit values BRKIN based on the map 1, it is possible to alleviate the calculation load of the engine control unit 10 and also improve the flexibility with the setting of the coast stop allowing upper limit values BRKIN.

As described above, with embodiment 3, in addition to (1) to (3) above, the following advantages can be achieved.

(4) The first threshold setting means (step S304) sets a plurality of first thresholds (coast stop allowing lower limit values BRKOUT) such that the first threshold becomes smaller as the vehicle speed VSP lowers.

Consequently, it is possible to re-start the engine 1 in a more appropriate, timelier manner, so that mileage can be improved better.

(5) The first threshold setting means (step S304) sets the first thresholds (coast stop allowing lower limit values BRKOUT) based on a predetermined map (map 2).

Consequently, it is possible to improve the flexibility of the setting of the first thresholds (coast stop allowing lower limit values BRKOUT).

(6) The second threshold setting means (step S303) sets a plurality of second thresholds (coast stop allowing upper limit values BRKIN) such that the second threshold becomes smaller as the vehicle speed VSP lowers.

Consequently, it is possible to re-start the engine 1 in a more appropriate, timelier manner, so that it is possible make the braking of the vehicle smoother.

(7) The second threshold setting means (step S303) sets the second thresholds (coast stop allowing upper limit values BRKIN) based on a predetermined map (map 1).

Consequently, it is possible to improve the flexibility of the setting of the second thresholds (coast stop allowing upper limit values BRKIN).

Embodiment 4

Figure 8:
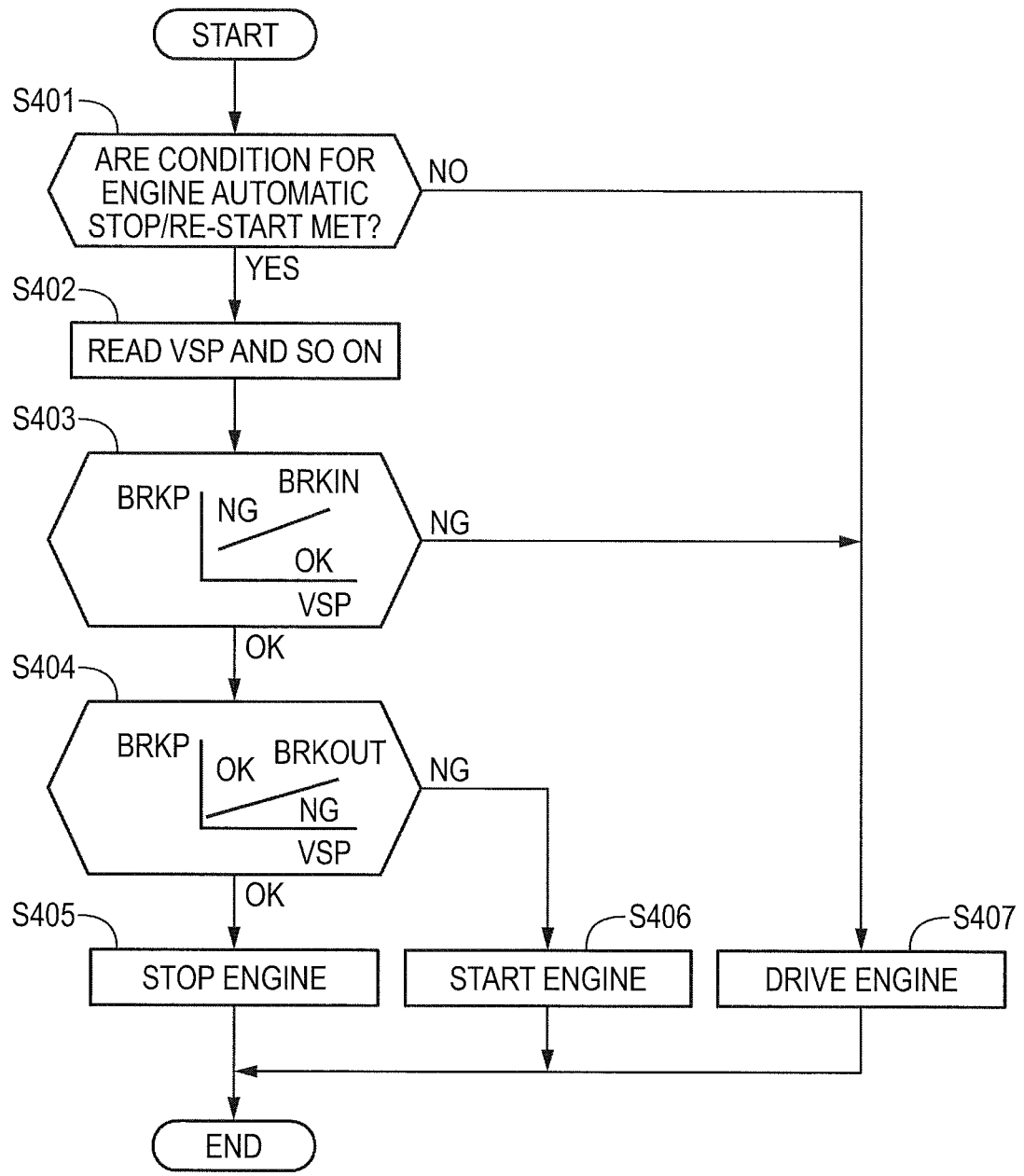
FIG. 8 is a flowchart showing an engine automatic stop/re-start control process according to embodiment 4.

Next, embodiment 4 will be described. The basic configuration is the same as embodiment 3, so that the different points alone will be described. FIG. 8 is a flowchart showing the engine automatic stop/re-start control process executed in the engine control unit 10 according to embodiment 4.

The engine control unit 10 calculates the coast stop allowing upper limit value BRKIN and lower limit value BRKOUT based on the vehicle speed VSP, using an algorithm 1, by which the coast stop allowing upper limit value BRKIN is calculated smaller as the vehicle speed VSP lowers, and an algorithm 2, by which the coast stop allowing lower limit value BRKOUT is calculated smaller as the vehicle speed VSP lowers. The algorithms 1 and 2 are able to, for example, allow such properties that the upper limit value BRKIN or the lower limit value BRKOUT becomes linearly smaller in accordance with the decrease of the vehicle speed VSP.

Step S401 is the same as step S301 of FIG. 6.

In step S402, the vehicle speed VSP, the amount of brake pedal operation (the master cylinder pressure) BRKP, and the upper limit value and lower limit value for the amount of brake pedal operation BRKP to allow idling stop control, are read, and the step moves on to step S403.

In step S403, the coast stop allowing upper limit value BRKIN is calculated based on the vehicle speed VSP that is read and the algorithm 1, and whether or not the amount of brake pedal operation BRKP that is read falls below the above coast stop allowing upper limit value BRKIN is decided. In other words, which one of the coast stop allowing (OK) area and the coast stop disallowing (NG) area, which are separated by the properties of the coast stop allowing upper limit value BRKIN (represented in the algorithm 1), the driving conditions as of then (the vehicle speed VSP and the amount of brake pedal operation BRKP) belong to, is decided. When the amount of brake pedal operation BRKP is decided to fall below the coast stop allowing upper limit value BRKIN (and therefore belong to the coast stop allowing area), the step moves on to step S404, and, when the amount of brake pedal operation BRKP is decided to be equal to or greater than the coast stop allowing upper limit value BRKIN (and therefore belong to the coast stop disallowing area), the step moves on to step S407, and the engine's working conditions are retained.

In step S404, the coast stop allowing lower limit value BRKOUT is calculated based on the vehicle speed VSP that is read and the algorithm 2, and whether or not the amount of brake pedal operation BRKP that is read falls below the above coast stop allowing lower limit value BRKOUT is decided. In other words, which one of the coast stop allowing (OK) area and the coast stop disallowing (NG) area, which are separated by the properties of the coast stop allowing lower limit value BRKOUT (represented in the algorithm 2), the driving conditions as of then (the vehicle speed VSP and the amount of brake pedal operation BRKP) belong to, is decided. When the amount of brake pedal operation BRKP is decided to fall below the coast stop allowing lower limit value BRKOUT (and therefore belong to the coast stop disallowing area), the step moves on to step S406 and the engine is re-started, and, when the amount of brake pedal operation BRKP is decided to be equal to or greater than the coast stop allowing lower limit value BRKOUT (and therefore belong to the coast stop allowing area), the step moves on to step S405 and the engine is stopped.

[Operation]

Figure 9:
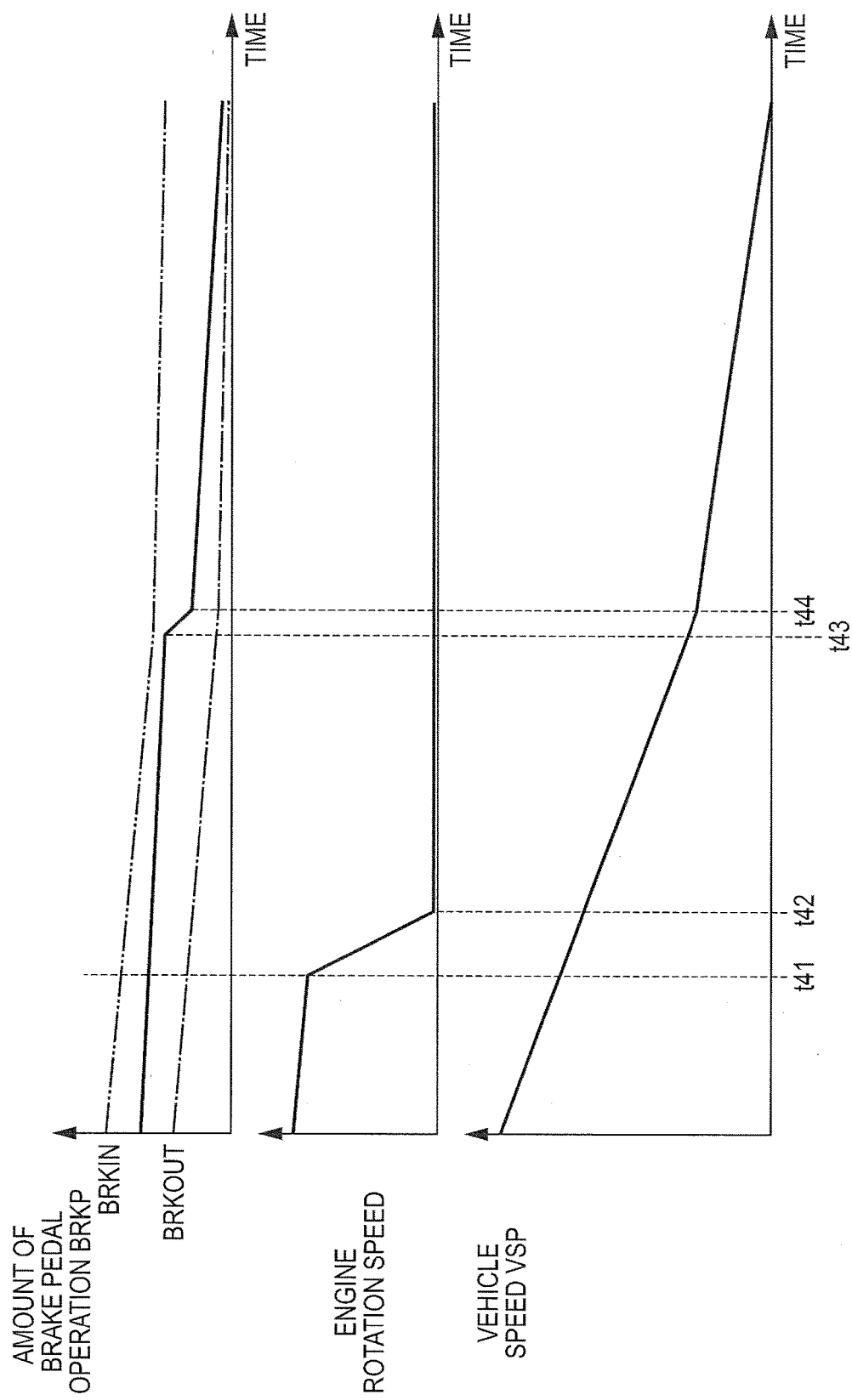
FIG. 9 is a time chart showing an operation of a process of setting a coast stop allowing upper limit value and lower limit value upon coast drive, according to embodiment 4.

Next, the operation based on the above control process will be described. FIG. 9 is the same time chart as for embodiment 1 (FIG. 3), showing the operation of the process of setting the coast stop allowing upper limit value BRKIN and lower limit value BRKOUT upon coast drive according to embodiment 4.

At and before time t41, although the driver steps on the brake pedal, the conditions to allow the engine automatic stop/re-start control are not met, and therefore the control process of FIG. 8 follow the flow of steps S401 S407, and the working conditions of the engine 1 are retained. The amount of brake pedal operation BRKP by the driver decreases gradually.

At time t41, the conditions to allow the engine automatic stop/re-start control are met. Also, the amount of brake pedal operation BRKP falls below the coast stop allowing upper limit value BRKIN that is calculated from the vehicle speed VSP and the algorithm 1, and also is equal to or greater than the coast stop allowing lower limit value BRKOUT that is calculated from the vehicle speed VSP and the algorithm 2. Consequently, the steps follow the flow of steps S401→S402→S403→S404→S405, and the engine is stopped. After time t41, at which coast stop is started, the engine rotation speed decreases rapidly toward zero.

At time t42, the engine rotation speed becomes virtually zero.

At times t43 and t44, the driver softens the step on the brake pedal stepwise. Accompanying this, at and after times t43 and t44, the decreasing gradient of the vehicle speed VSP (the amount of decrease per time) decreases. Also, the decreasing gradients of the coast stop allowing upper limit value BRKIN and lower limit value BRKOUT that are calculated based on the vehicle speed VSP decrease.

At and after time t41, the amount of brake pedal operation BRKP decreases. Parallel to this, the coast stop allowing lower limit value BRKOUT decreases in accordance with the decrease of the vehicle speed VSP, so that the amount of brake pedal operation BRKP is prevented from falling below the coast stop allowing lower limit value BRKOUT. In other words, the driving conditions (the vehicle speed VSP and the amount of brake pedal operation BRKP) stay in the coast stop allowing area. Consequently, the steps follow the flow of steps S401→S402→S403→S404→S405, and the engine is kept stopped.

Also, since the coast stop allowing upper limit value BRKIN decreases in accordance with the decrease of the vehicle speed VSP at and after time t41, if the driver steps on the brake pedal, after that, the amount of brake pedal operation BRKP is likely to become equal to or greater than the coast stop allowing upper limit value BRKIN comparatively quickly. In other words, the driving conditions (the vehicle speed VSP and the amount of brake pedal operation BRKP) are likely to shift from the coast stop allowing area to the disallowing area. Consequently, the engine is re-started more quickly.

As described above, with embodiment 4, the coast stop allowing upper limit value BRKIN and the coast stop allowing lower limit value BRKOUT are set based on the algorithms 1 and 2, respectively. Consequently, compared to the case where, for example, the upper limit value BRKIN and lower limit value BRKOUT are set using maps, it is possible to reduce the amount of data to be stored in the engine control unit 10. That is, when an attempt is made to break down more finely and set the upper limit value BRKIN and the lower limit value BRKOUT in accordance with the vehicle speed VSP, although using maps might result in an increased amount of data, using algorithms makes it possible to minimize the increase of the amount of data.

As described above, with embodiment 4, in addition to (1) to (4) and (6) above, the following advantages can be achieved.

(8) The first threshold setting means (step S404) sets the first threshold (the coast stop allowing lower limit value BRKOUT) based on a predetermined algorithm (the algorithm 2).

Consequently, it is possible to reduce the amount of data that is stored.

(9) The second threshold setting means (step S403) sets the second threshold (the coast stop allowing upper limit value BRKIN) based on a predetermined algorithm (the algorithm 1).

Consequently, it is possible to reduce the amount of data that is stored.

Other Embodiments

Although the present invention has been described above based on embodiments 1 to 4, the above embodiments are by no means limiting, and other configurations may be covered by the present invention as well.

For example, although examples to employ a belt-type continuously-variable transmission have been illustrated with embodiments 1 to 4, configurations to have other automatic stepwise variable transmissions, manual variable transmissions and so on may be used as well. Also, although examples to have a torque converter have been illustrated, vehicles without a torque converter are also applicable. In these cases, as parameters of the conditions to allow coast stop control (engine automatic stop), other parameters (the combination of the vehicle speed and the transmission ratio, the engine rotation speed, and so on) to represent whether or not it is possible to maintain the self-sustaining rotation of the engine may be used, instead of the predetermined vehicle speed CSVSP1.

Also, with embodiments 2 and 3, the vehicle speed VSP to serve as the threshold for changing the coast stop allowing upper limit value BRKIN does not have to be the same as the vehicle speed VSP to serve as the threshold for changing the coast stop allowing lower limit value BRKOUT, and both vehicle speeds VSP may be made different.

Also, with embodiments 3 and 4, it is equally possible not to change the coast stop allowing upper limit value BRKIN in accordance with the vehicle speed VSP.

This application claims priority based on Japanese Patent Application No. 2011-262817, filed with the Japan Patent Office, on Nov. 30, 2011, the entire content of which is expressly incorporated herein by reference.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle engine automatic control device, comprising:
   a brake operation amount detecting unit that detects an amount of brake operation by a driver;
   an engine stopping/re-starting unit that stops, during coast drive, an engine based on only the amount of brake operation detected by the brake operation amount detecting unit, the engine stopping/re-starting unit being configured to re-start the engine when the amount of brake operation detected by the brake operation amount detecting unit falls below a first threshold after the engine stops during the coast drive; and
   a first threshold setting unit that sets the first threshold smaller as vehicle speed becomes lower.

2. The vehicle engine automatic control device according to claim 1, wherein the first threshold setting unit sets a plurality of first thresholds such that the first threshold becomes smaller as the vehicle speed becomes lower.

3. The vehicle engine automatic control device according to claim 1, wherein the first threshold setting unit sets the first threshold based on a predetermined map.

4. The vehicle engine automatic control device according to claim 1, wherein the first threshold setting unit sets the first threshold based on a predetermined algorithm.

5. The vehicle engine automatic control device according to claim 1,
wherein the engine stopping/re-starting unit re-starts the engine, during coast drive, after the engine stops, when the amount of brake operation that is detected becomes equal to or greater than a second threshold, and
wherein the second threshold is greater than the first threshold.

6. The vehicle engine automatic control device according to claim 5, further comprising a second threshold setting unit that sets the second threshold smaller as the vehicle speed becomes lower.

7. The vehicle engine automatic control device according to claim 2, wherein the first threshold setting unit sets the first threshold based on a predetermined map.

8. The vehicle engine automatic control device according to claim 2, wherein the first threshold setting unit sets the first threshold based on a predetermined algorithm.

9. The vehicle engine automatic control device according to claim 2,
wherein the engine stopping/re-starting unit re-starts the engine, during coast drive, after the engine stops, when the amount of brake operation that is detected becomes equal to or greater than a second threshold, and
wherein the second threshold is greater than the first threshold.

10. The vehicle engine automatic control device according to claim 3,
wherein the engine stopping/re-starting unit re-starts the engine, during coast drive, after the engine stops, when the amount of brake operation that is detected becomes equal to or greater than a second threshold, and
wherein the second threshold is greater than the first threshold.

11. The vehicle engine automatic control device according to claim 4,
wherein the engine stopping/re-starting unit re-starts the engine, during coast drive, after the engine stops, when the amount of brake operation that is detected becomes equal to or greater than a second threshold, and
wherein the second threshold is greater than the first threshold.

* * * * *